Figure 1:
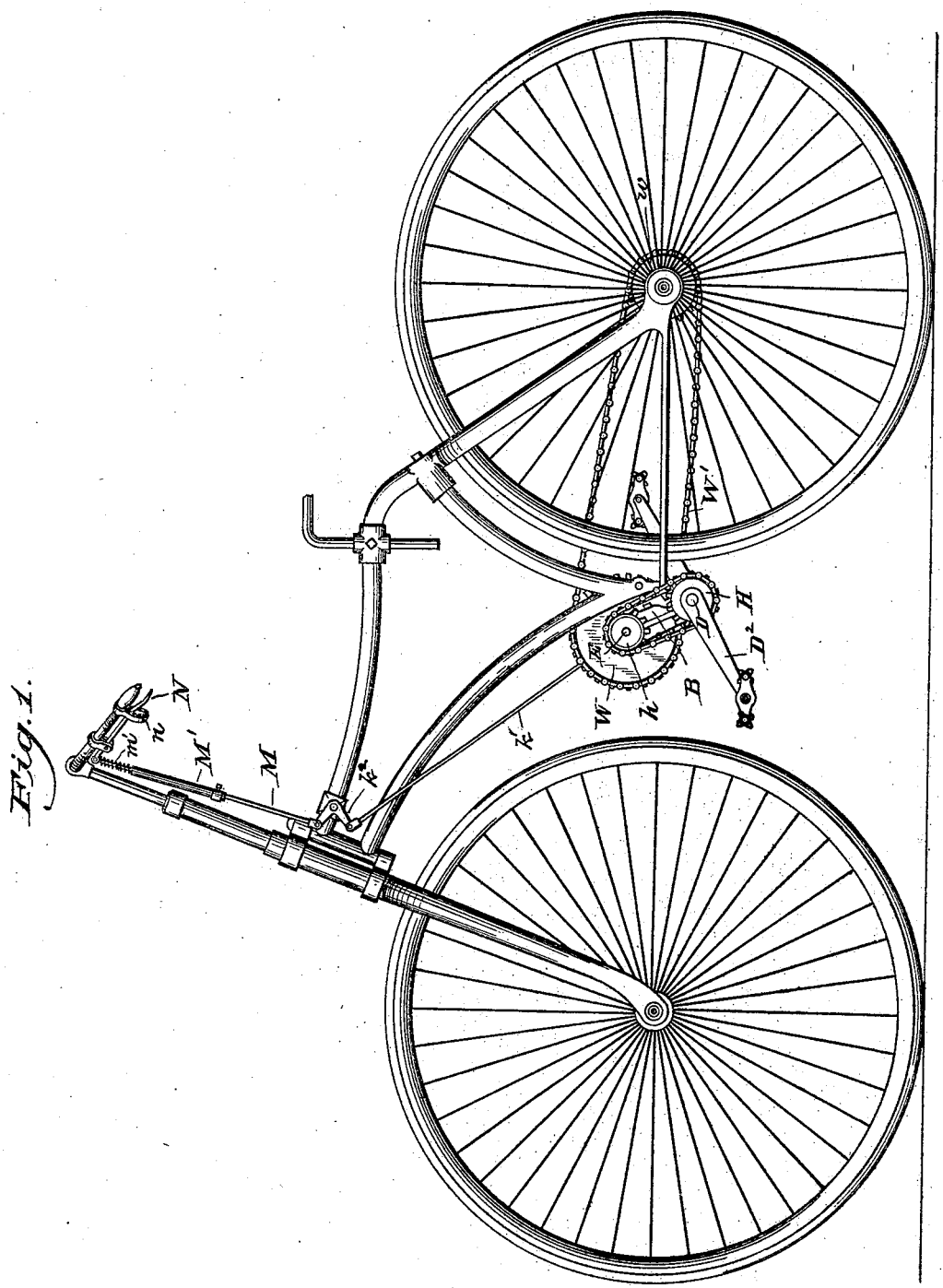

(No Model.)
R. B. CUNNINGHAM.
BICYCLE DRIVING GEAR.
No. 501,874. Patented July 18, 1893.
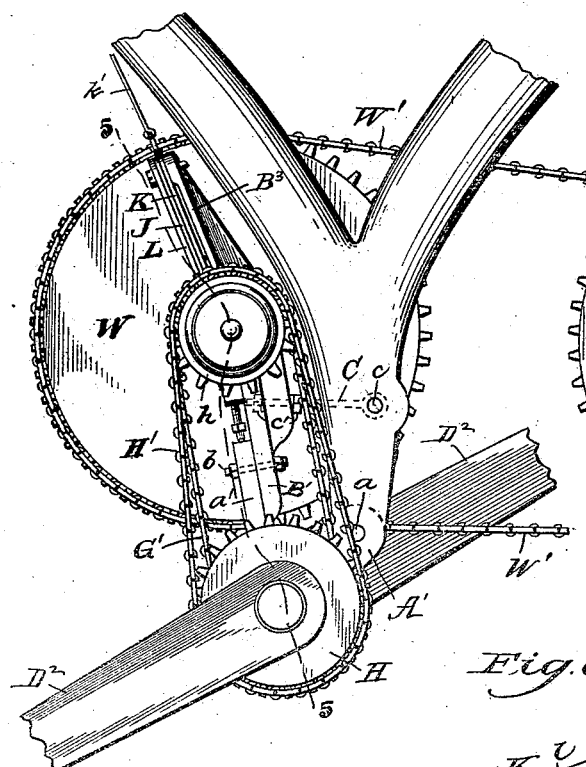
Fig. 2.
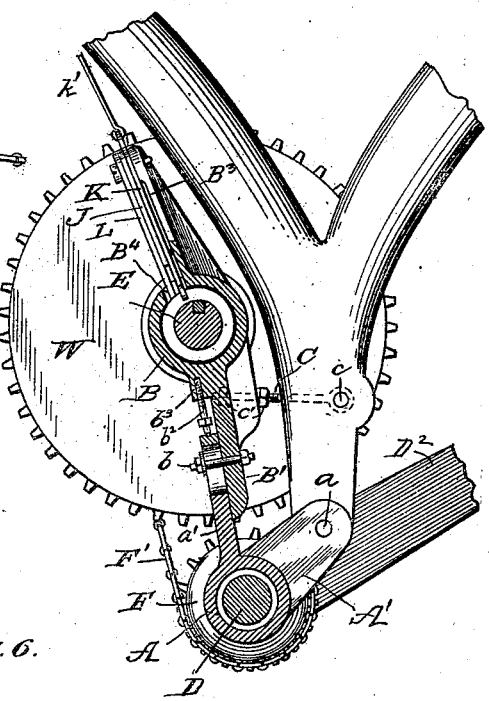
Fig. 3.
Fig. 7. Fig. 8.
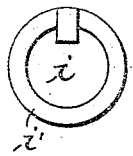
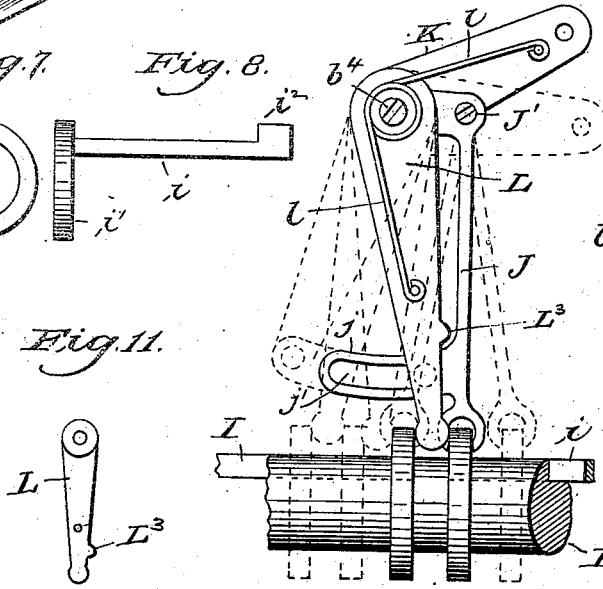
Fig. 6.
Fig. 9. Fig. 10.
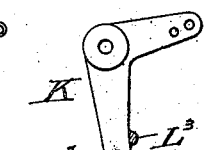
Fig. 11.
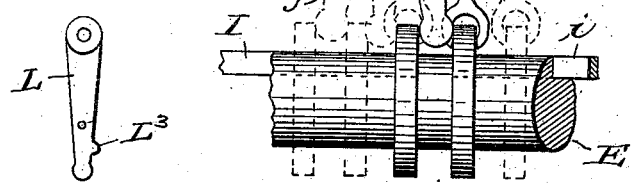
Fig. 12.
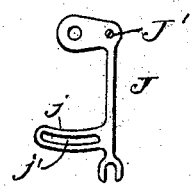
Witnesses:
Wm A. Schoenborn
James R Mansfield
Inventor:
R. B. Cunningham
by Alexander & Dowell
Attorneys (No Model.)
R. B. CUNNINGHAM.
BICYCLE DRIVING GEAR.
No. 501,874.
3 Sheets—Sheet 3.
Patented July 18, 1893.
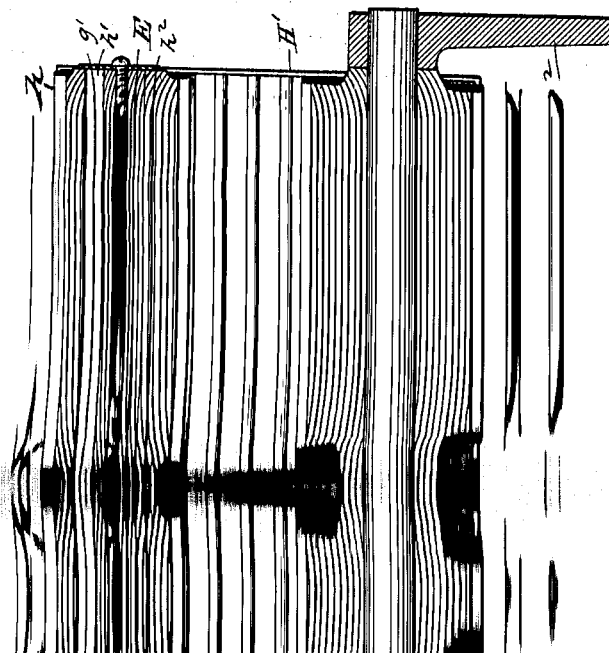

UNITED STATES PATENT OFFICE.

RICHARD B. CUNNINGHAM, OF HILLSBOROUGH, OHIO, ASSIGNOR OF TWO-THIRDS TO P. J. GEYLER AND O. S. PRICE, OF SAME PLACE.

BICYCLE DRIVING-GEAR.

SPECIFICATION forming part of Letters Patent No. 501,874, dated July 18, 1893.

Application filed December 20, 1892. Serial No. 455,762. (No model.)

*To all whom it may concern:*

Be it known that I, RICHARD B. CUNNINGHAM, of Hillsborough, in the county of Highland and State of Ohio, have invented certain new and useful Improvements in Bicycle Driving Gear; and I do hereby declare that the following is a full, clear, and exact description thereof, reference being had to the accompanying drawings, and to the letters of reference marked thereon, which form part of this specification.

This invention is an improved variable speed driving gear for bicycles and similar vehicles, and its objects are to enable the driver to increase or diminish the speed of the wheel in relation to the speed of the pedal shaft, thereby increasing or diminishing the leverage or power exerted by the pedals without stopping the machine, or the rotation of the pedal shaft; and also to enable him to rest his feet on the pedals, stopping the pedal shaft without stopping the movement or the bicycle.

The invention is especially designed for use with "safety" bicycles but can be adapted to other forms of bicycles, and other vehicles propelled by foot power.

The invention consists in the novel construction and combination of parts, which are hereinafter explained in detail, and summarized in the claims.

Referring to the drawings by letter—Figure 1 is a side elevation of a bicycle equipped with my improved variable speed driving gear. Fig. 2 is an enlarged side view of the drive mechanism. Fig. 3 is a vertical section therethrough on line 3—3 Fig. 4. Fig. 4 is a front view thereof. Fig. 5 is a transverse section through the driving gear, on line 5—5 Fig. 2. Fig. 6 is a diagrammatical view illustrating the various positions of the key shifting levers. Figs. 7 and 8 are detail side and end views of a key. Figs. 9, 10, 11, and 12, are detail views of said levers and the connecting spring. Fig. 13 is a detail sectional view of the shifting rod. Fig. 14 is a detail.

In the drawings the bicycle is shown of the "safety" type. To the frame thereof at a point where the pedal shaft is usually mounted, is pivoted a shaft mounting consisting of a sleeve A, having rearwardly projecting lugs A' which are pivotally connected to the frame by a pin $a$, as shown, thereby supporting the sleeve A in a horizontal position in front of the rear wheel, and in such manner that it can be swung or adjusted on its pivot $a$. This sleeve has another upstanding pair of arms $a'$ $a'$ which support a superimposed shaft bearing consisting of a sleeve B having a depending pair of arms B' B' which are fastened to arms $a'$ by means of bolts and nuts $b$, as shown, said bolts playing through corresponding slots in said arms $a'$ as indicated.

$b^2$, $b^2$, are spreading bolts interposed between the ends of arms $a'$ and sleeve B, and tapped into screw threaded sockets $b^3$ on the sleeve, as shown, and thus by means of bolts $b$ and $b^2$, the sleeves can be adjusted toward or from each other and rigidly fastened together.

C is a rod connected to the frame as indicated at $c$ by its rear end while its front end is threaded and passes through an opening in a web $B^2$ between arms B'. Nuts $c'$ are screwed on said rod in front of and behind the web by which means the hangers can be adjusted so as to move sleeve B toward or from the rear wheel, and lock it when adjusted.

D is a pedal shaft journaled in sleeve A, preferably supported therein by ball bearings $d$, $d$, as indicated in Fig. 5. On the outer ends of this shaft are fastened the pedal cranks $D^2$ of ordinary construction.

E is a shaft journaled in sleeve B preferably on ball bearings $e$, $e$, as indicated.

On one end of shaft D is a sprocket pinion F which is connected by a sprocket chain F' with a larger sprocket $f$ on the adjoining end of shaft E. On the opposite end of shaft D are sprocket pinions G, H, of different diameters. The former is connected by a chain G' with about an equal sized sprocket pinion $g$ on the adjoining end of shaft E, and the latter (H) is likewise connected by a sprocket chain H' with a smaller sized sprocket pinion $h$ on shaft E as indicated in the drawings. The sprockets F, G, H, are fast on shaft D. Sprockets $f$, $g$, $h$, are loose on shaft E. On shaft E is also rigidly mounted beside sprocket $f$, a larger sprocket wheel W which is connected by a driving sprocket chain W' with a sprocket $w$ fixed on the drive (rear) wheel shaft of the machine. Shaft E has a longitudinal key slot E' in which lie two movable keys I, and $i$. The inner ends of said keys are connected to rings I', $i'$, which loosely encircle shaft E within the sleeve B (which is made of such interior diameter that these rings may be laterally shifted therein). The keys extend through the journal bearing of the shaft in sleeve B, being reduced so as not to interfere with the free rotation of the shaft, but have short projecting teeth $I^2$, $i^2$, respectively on their outer ends. Tooth $I^2$, is normally held in a key slot $W^2$ of sprocket W, but can be shifted outward into engagement with a key slot $f'$ of sprocket $f$ thereby engaging the sprocket $f$ with the shaft. It is however normally held in slot $W^2$ by means of a helical spring $I^4$, surrounding shaft E within the sleeve B, interposed between ring I' and the bearing $e$ as shown. If the key I be moved outward until it is stopped by the washer plates $E^2$ which confines sprocket $f$ on shaft E, its tooth $I^2$ will enter an annular enlargement $f^2$ of the bore of sprocket $f$, so that sprocket $f$ can revolve freely on shaft E, or be independent thereof.

On the outer end of key $i$ is a tooth $i^2$ adapted to engage a key slot $g'$ in sprocket $g$, or $h'$ in sprocket $h$, but cannot engage both at the same time, since when it is midway between said sprockets it enters an annular passage formed by annular enlargements $h^2$, $g^2$, of the bores of sprockets $h$, $g$, and when in this position said sprockets can rotate freely on the shaft E and vice versa. Key $i$ is held in this intermediate position by means of a spring shifting arm J which is secured on a pin $b^4$ attached to an upstanding wing or flange $B^3$ of sleeve B. The lower end of this arm is bifurcated and extends into sleeve B through a slot $B^4$ therein, and loosely embraces the ring $i'$ as shown in Figs. 5 and 6. The arm is prevented from rocking on the pin $b^4$ by a screw J' by which its normal position is regulated. This arm is sufficiently flexible to permit it to be laterally vibrated as hereinafter described, so as to move key $i$ inward or outward, thereby bringing tooth $i^2$ into engagement with sprocket $g$ or $h$. Arm J has a lateral extension $j$ near its lower end which is longitudinally slotted, and in this slot plays a stud $k$ on the lower end of the depending arm of a bell crank lever K pivoted at its bend upon the pin $b^4$. The arm J will be vibrated by the rocking motion of lever K only when stud $k$ reaches the extremity of the slot $j'$ in extension $j$.

L is a vibrating arm also pivoted on pin $b^4$, its lower end extending into sleeve B through slot $B^4$ and lying between rings I' $i'$. Arm L has a lateral key $L^3$ which bears against the side of lever K and is normally held in contact therewith by means of a spring $l$ which is coiled around pin $b^4$ and has one end attached to the horizontal arm of lever K and its other end attached to arm L, see Fig. 5. When lever K is rocked by depressing its upper arm, spring $l$ is tensioned, and arm L is thereby rocked so as to force key I outward as indicated in the diagram Fig. 6. Lever K is operated by means of a rod $k'$ pivoted at one end to its horizontal arm and at its other end to one end of a bell crank $k^2$ pivoted to the frame near the guide wheel shank, and the other arm of crank $k^2$ is connected by a jointed rod M with a hand lever N fulcrumed to one of the handle bars, the outer end of said lever N being engaged by a keeper $n$ attached to the handle, said keeper having a series of notches $n'$, and its end $n^2$ being upturned opposite said notches so as to keep the hand lever in engagement therewith. The rod M has a tubular upper portion M' in which plays a rod $m$ pivoted to the end of lever N, and between the end of part M' and the lever N around rod $m$ is a helical spring $m'$ of sufficient tensile strength to cause normally the shifting of rod M up or down when lever N is oscillated, but if for any reason (as for instance, tooth $I^2$, or $i^2$, striking the side of their respective sprockets because the key slots thereof and of the shaft do not happen to register at the moment the lever N is oscillated), the lever K is stopped or locked, the spring will compress or extend so as to prevent injury to parts (and as soon as the proper key slots register will automatically perfect the shifting of lever K). As shown, sprockets F, $f$, are the "slow speed" sprockets, G, $g$, the "medium speed" and sprockets H, $h$, the "fast" speed gearing.

The normal position of parts as indicated in Fig. 5 is with the sprockets $f$, $g$, $h$, idle on shaft E, and sprocket W locked thereto. The operation of parts may then be described as follows:—In starting, the rider shifts lever N so as to rock lever K and cause it to rock arm L outward, thereby shifting tooth $I^2$ so that it interlocks sprocket $f$ with shaft E. The power applied to shaft D is therefore transmitted through sprockets F, $f$, and chain F', to shaft E and from the latter through sprockets $w$, W, and chain W' to the drive wheel, giving the most powerful pedal leverage, and a slow speed. To increase the speed, the rider shifts lever N so as to still further shift lever K in the same direction, and by so doing tooth $I^2$ is shifted so as to enter the annular space $f'$ in sprocket $f$ which then turns idly on the shaft E. At the same time however stud $k$ having reached the end of slot $j'$ pulls arm J inward, so as to shift key $i$ and cause tooth $i^2$ to interlock shaft E and sprocket $g$. In this position of parts power will be transmitted through sprockets G and $g$ and chain G' to shaft E and thence to the drive wheel as described, giving an increased speed of the machine, or of shaft E in relation to shaft D. To attain the greatest speed, the rider reverses the movement of lever N so as to reverse the movement of lever K which, swinging to the opposite side allows spring $I^3$ to shift key I back to normal position, and forces arm J outward thereby shifting key $i$ so as to disengage tooth $i$ from sprocket $g$ and engage it with sprocket $h$. In this position power will be transmitted from shaft D through sprockets H and $h$ and chain H' to shaft E, giving an increased speed, or increased number of revolutions of shaft E in relation to shaft D, sprockets $f$, $g$, running idly on the shaft. These several operations can be performed without the rider taking his feet off the pedals, or stopping the machine, and either set of gearing may be immediately brought into use at his will. When he desires to "coast" lever N is shifted to normal position, so that sprockets $f$, $g$, $h$, are disengaged from shaft E and rotate idly thereon. This can be done without taking the feet off the pedals, which then can be used as foot rests.

The utility of the device is apparent from the foregoing and the rider can adjust the "speed" of the drive to suit his will, or strength.

I do not intend to confine myself to the use of sprocket gearing only, as it is obvious other forms of gearing may be used for transmitting motion from shaft D to E, or from the latter to the main wheel; for instance, intermeshing pinions, which would not necessitate alterations of the inner operating parts or clutch devices.

This gear attachment can be applied to various forms of bicycles without alteration of the latter, or special construction thereof, as will be obvious from the foregoing description.

Having described my invention, what I claim as new, and desire to secure by Letters Patent thereon, is—

1. The combination of the frame and wheels, the pedal shaft, and an auxiliary shaft beside the same, the sprockets and chains for transmitting motion from one shaft to the other, and means for transmitting motion from one shaft to the drive wheel; with the independent keys playing in, and lying end to end in a slot in said auxiliary shaft having teeth on their ends adapted to interlock the sprockets on the auxiliary shafts therewith when shifted, and the arms and levers and connections whereby said keys are separately or simultaneously shifted, substantially as and for the purpose described.

2. The combination of the frame and wheels, a pair of sleeves connected to the frame, shafts journaled in said sleeves, a set of sprockets and chains for transmitting motion from one of said shafts to the other, movable keys concealed in one sleeve adapted to interlock the sprockets thereon therewith, and the arms J and L, and crank lever K, and connections for shifting said keys, substantially as described.

3. The combination of the main frame, the wheels, the pedal shaft and auxiliary shaft suspended therefrom, the gearing for transmitting motion from one shaft to the other, a clutch device for engaging or disengaging said gearing from the auxiliary shaft, and the hand lever, rods $m$, M, and spring $m'$, and connections for operating said clutch, substantially as described.

4. The combination of the frame, its wheels, the pedal shaft and auxiliary shaft parallel therewith, the gearing between said shafts, and means for transmitting motion from the auxiliary shaft to the main wheel; with the key I, arm L, levers K, $k^2$, N, and rods $k'$, M, and catch $n$, all constructed and arranged to operate substantially as described.

5. The combination of the main frame, the wheels, the pedal shaft, the auxiliary shaft, attached thereto, and the adjoining sets of gearing for transmitting motion from the pedal to the auxiliary shaft, with the key $i$, arm J, lever K, and connections substantially as described, whereby said key can be shifted to throw either set of gearing into operation, substantially as described.

6. The combination of the pedal and auxiliary shafts, the sprockets F, G, and H, on the pedal shaft, and sprockets $f$, $g$, $h$, on the auxiliary shaft, the sliding keys $i$, I, the spring arm J engaging key $i$, the arm L engaging key I, and the lever K adapted to operate either or both of said arms, and mechanism for shifting said lever, substantially as specified.

7. The combination of the main frame, and its wheels a sleeve suspended from the frame, a slotted shaft in said sleeve, sprockets on the opposite ends of said shaft, keys playing in the slot of said shaft and adapted to respectively interlock the opposite ratchets therewith, and the arms J, L, and lever K substantially as described for independently shifting either key, and for normally keeping them out of engagement with the sprockets, substantially as set forth.

8. The combination of the main frame and its wheels a sleeve suspended from the frame, a slotted shaft in said sleeve, sprockets on the opposite ends of said shaft, keys playing in the slot of said shaft and adapted to respectively interlock the opposite ratchets therewith, and the arms J, L, and lever K substantially as described for independently shifting either key, and for normally keeping them out of engagement with the sprockets, and another shaft parallel with the former and carrying similar number of sprockets, and chains for transmitting motion from the sprockets on one shaft to the other, substantially as described, and from the driven shaft to the main wheel, substantially as specified.

In testimony that I claim the foregoing as my own I affix my signature in presence of two witnesses.

RICHARD B. CUNNINGHAM.

Witnesses:
GEORGE L. GARRETT,
WM. MATTHEWS.